N. J. BECKNER.
LAWN MOWER.
APPLICATION FILED MAY 7, 1919.
1,344,852.
Patented June 29, 1920.
3 SHEETS—SHEET 1.
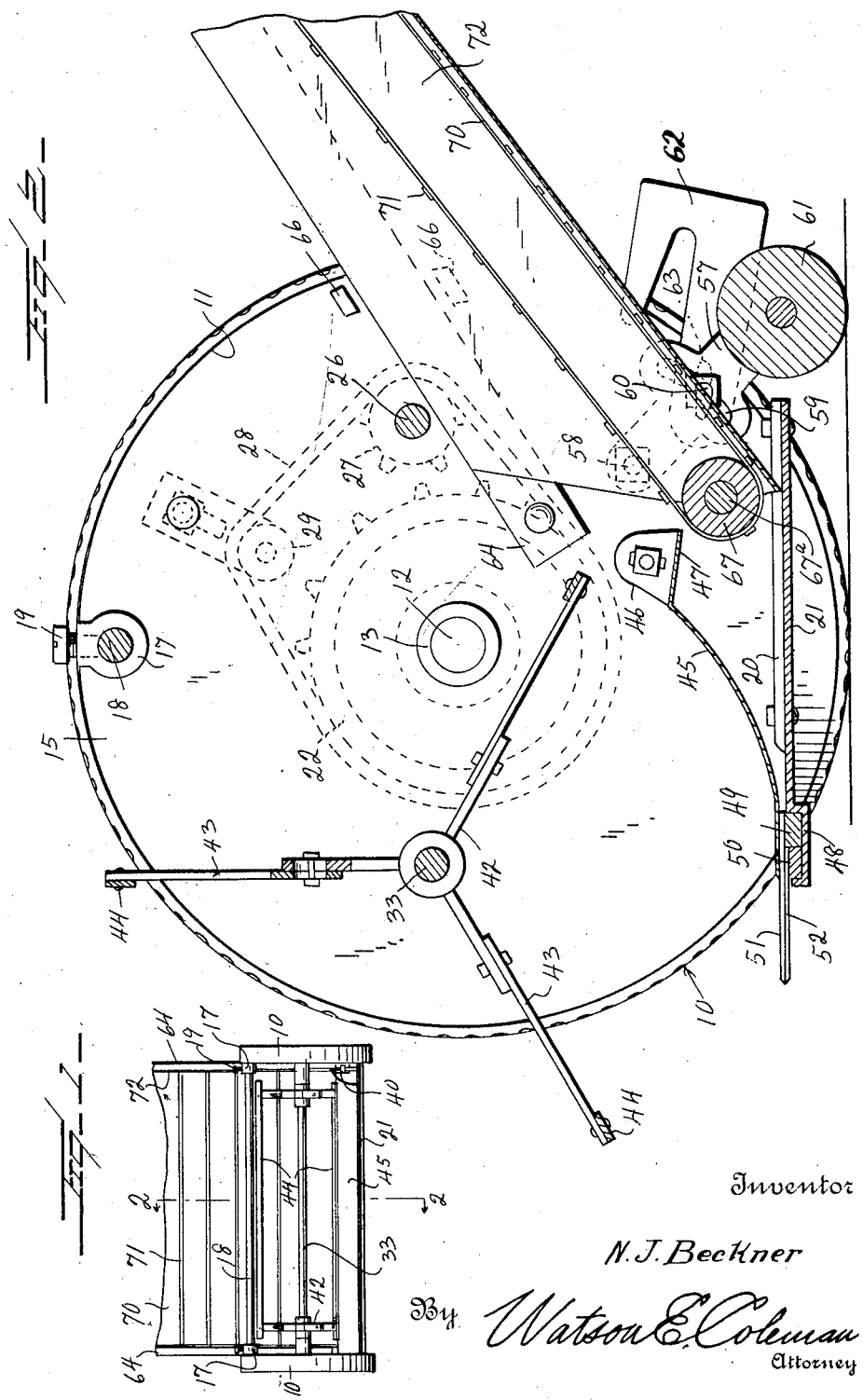
Inventor
N. J. Beckner
By Watson E. Coleman
Attorney N. J. BECKNER.
LAWN MOWER.
APPLICATION FILED MAY 7, 1919.
1,344,852.
Patented June 29, 1920.
3 SHEETS—SHEET 2.
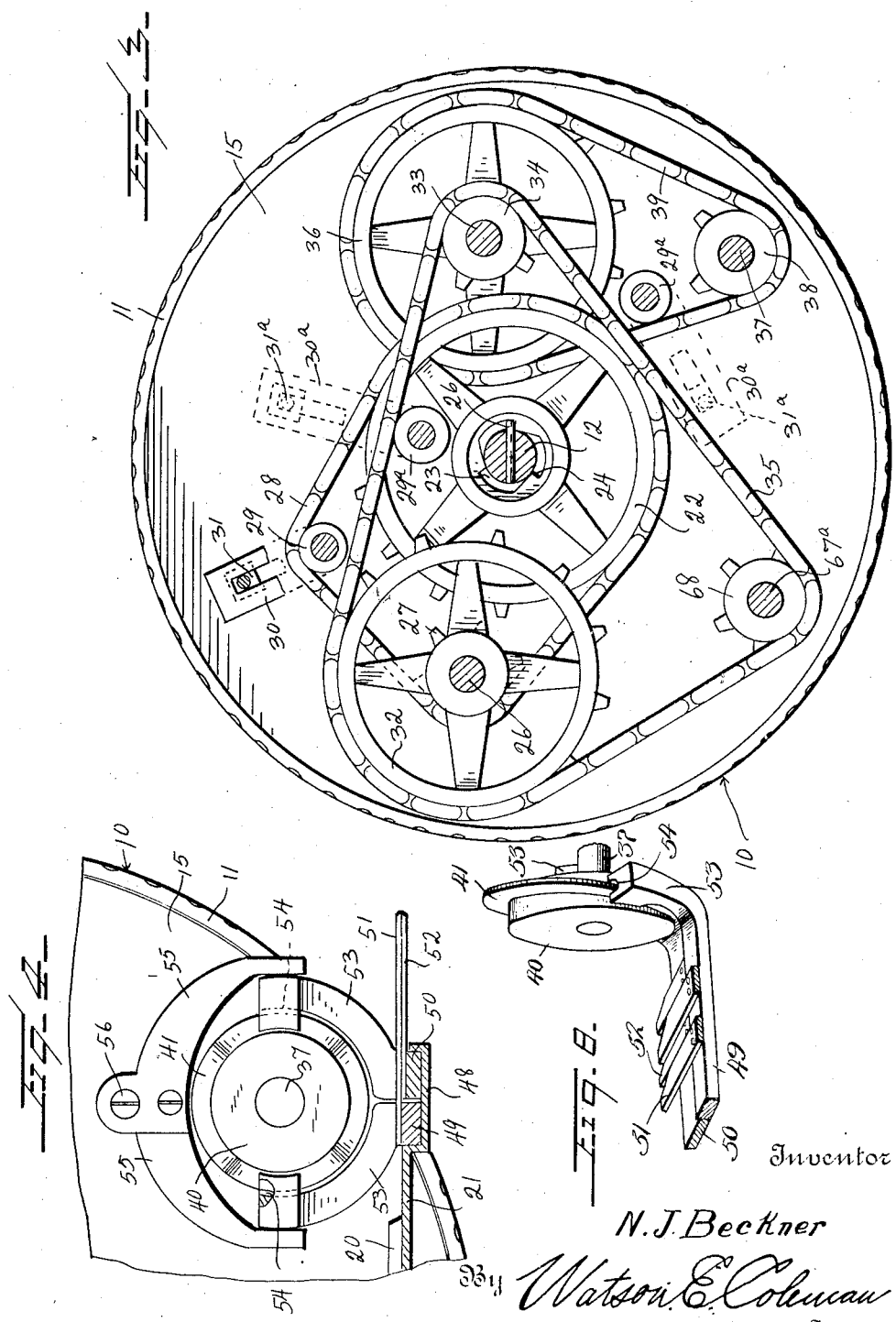
Inventor
N. J. Beckner
By Watson E. Coleman
Attorney

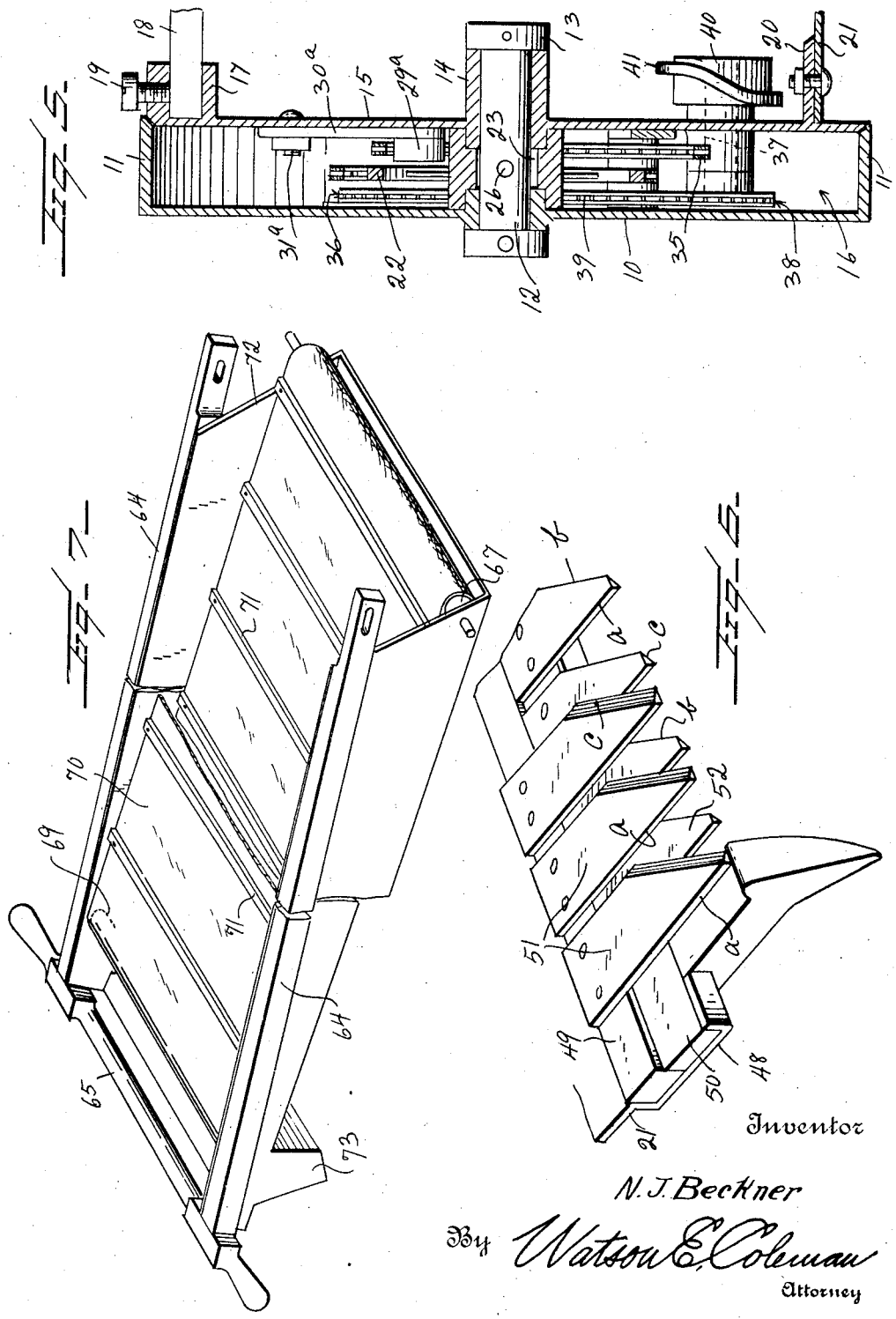

UNITED STATES PATENT OFFICE.

NOAH J. BECKNER, OF YAKIMA, WASHINGTON.

LAWN-MOWER.

1,344,852. Specification of Letters Patent. Patented June 29, 1920.

Application filed May 7, 1919. Serial No. 295,273.

*To all whom it may concern:*

Be it known that I, NOAH J. BECKNER, a citizen of the United States, residing at Yakima, in the county of Yakima and State of Washington, have invented certain new and useful Improvements in Lawn-Mowers, of which the following is a specification, reference being had to the accompanying drawings.

This invention relates to lawn mowers, and particularly to that form of lawn mower in which cutting knives are operated by means of traction wheels or ground engaging wheels.

One object of my invention is to provide a lawn mower of exceedingly simple construction wherein reciprocating knives are used in place of the ordinary rotary knife, and in this connection to provide a lawn mower wherein two sets of reciprocating knives are used moving in opposite directions relative to each other and coacting with each other so as to avoid the necessity of providing fingers against which the knives operate.

A further object is to provide simple means for converting rotary motion of the traction or ground wheels into reciprocating motion of the cutter bars or knife bars.

A further object is to provide a lawn mower of this character with a reel and a platform, the reel acting to carry the cut grass rearward on this platform and to throw it back to any suitable bag or holder, or onto a carrier.

Still another object is to provide a lawn mower of this character with a carrier upon which the cut grass may be cast, which will carry the cut grass upward and rearward and discharge it into a bag.

Still another object is to provide means whereby the machine may be adjustably oscillated to carry the knife bars nearer to or farther from the ground to thus regulate the cut.

A still further object is to provide means whereby the knife bars with their knives thereon may be readily removed and replaced to permit the knives to be sharpened when they become dull.

A further object is to provide a construction of this character wherein all the delicate parts of the mechanism are housed and thoroughly protected from dirt or foreign matter, thus preventing the mechanism from becoming stalled by stones and sticks getting into the running gear.

A still further object is to provide improved means permitting the free rotative movement of the traction or ground wheels backward when the machine is drawn backward without affecting the driving mechanism of the knives or reel, but which will immediately cause the rotation of the reel and the reciprocation of the knives upon a forward movement of the machine.

Other objects will appear in the course of the following description.

My invention is illustrated in the accompanying drawings, wherein:—

Figure 1 is a fragmentary front elevation of a lawn mower constructed in accordance with my invention;

Fig. 2 is a sectional view on the line 2—2 of Fig. 1 looking in the direction of the arrows;

Fig. 3 is a side elevation of the traction wheel opposite to the traction wheel shown in Fig. 2, the corresponding disk 15 being removed and the shafts carried thereby being shown in section;

Fig. 4 is an end elevation of the cam and fenders and showing a portion of the cam carrying traction wheel and corresponding disk, the knife bars and the plate 21 being shown in section;

Fig. 5 is a vertical sectional view through the traction wheel shown in Fig. 3 and the corresponding disk and the gear wheels housed therein;

Fig. 6 is a fragmentary perspective view of the knife bars and knives mounted thereon;

Fig. 7 is a perspective view of the handle with the supported carrier.

Fig. 8 is a perspective view of the knife bar operating cam and a portion of one of the knife bars coacting therewith.

Referring to the drawings, it will be seen that my improved lawn mower has two ground engaging wheels 10 and $10^a$, which may be corrugated or otherwise formed upon their outer faces so as to secure a firm tractive engagement with the ground, each of these wheels being inwardly flanged, as at 11. Each of these wheels carries an inwardly projecting stub shaft 12, having a collar 13 at its inner end. Loosely surrounding each stub shaft and held from movement in one direction by the collar is a hub 14, carrying a disk 15, which has approximately the same diameter as the diameter of the traction wheel so that each traction wheel with its flange 11 and the corresponding disk forms a housing 16. The disks 15 have sockets 17 attached thereto, and disposed in these sockets is a transversely extending brace rod 18, held in place by set screws 19. Lugs or brackets 20 are formed upon the lower portions of each disk, and extending entirely across the machine between the disks is a sheet metal platform 21, which is bolted to these brackets or lugs 20. Two shafts also extend across, as will be later explained, from disk to disk, and thus the disks are firmly braced from each other.

Mounted upon each shaft 12 is a sprocket wheel 22. These sprocket wheels are loose upon the shaft 12, but the hub of each sprocket wheel is formed to provide a plurality of circumferentially extending recesses 23, each recess having a maximum depth at one end, and then gradually getting shallower toward the other end. The end wall 24 of each recess forms a tooth. Each shaft 12 is transversely slotted, and disposed in this slot is a dog 23ᵃ which slides through the slot transversely to the axis of the shaft 12, this dog having a length greater than the diameter of the shaft 12 so as to project beyond the shaft. The curved outer wall of the recess 23 will act as a cam to force the dog inward and project it at the diametrically opposite portion of the shaft.

It will be seen from Fig. 3, that when the dog is projected and the shaft 12 is rotated in a clockwise direction, the dog will engage against one of the shoulders 24 and will, therefore, communicate a clockwise rotation to the sprocket wheel 22, but that if the shaft 12 moves in a counter-clockwise direction, it will not cause any rotation of the sprocket wheel 22, but the dog will simply move inward sufficiently far to escape the shoulder 24. Thus, a rotation of the wheels 10, due to a rearward movement of the machine, will not cause any reverse rotation of the sprocket wheels 22, but a forward movement of the machine will cause a coincident rotation of the traction wheels 10 and the sprocket wheels 22.

Mounted upon a transverse shaft 26 which extends between the disks 15 are the relatively small sprocket wheels 27 disposed each within the wheels 10 and 10ᵃ, and sprocket chains 28 passes over the sprocket wheels 22 and around the sprocket wheels 27. A chain tightening roller 29 carried upon a sliding bracket 30 engages on the inside face of each sprocket chain 28 to thus permit the sprocket chain to be tightened up from time to time. This bracket 30 is shown as slotted, and is provided with a nut 31 operating on a bolt which passes through the slot of the bracket and into the corresponding disk 15, and thus the chain tightener may be shifted and then held in its shifted position.

It will be, of course, understood that there are two sprocket wheels 22, two sprocket wheels 27, and two sprocket chains 28 and, of course, a chain tightener for each sprocket chain.

Mounted upon the shaft 26 and disposed within the wheel 10 is a sprocket wheel 32, which may be made with the sprocket wheel 27 if desired and is, of course, much larger in diameter than the sprocket wheel 27. Disposed at the forward end of the machine and supported in bearings in both disks 15 is a transverse shaft 33, carrying upon it a sprocket wheel 34, and a sprocket chain 35 passes around the sprocket wheels 32 and 34. This sprocket wheel 34 is much smaller than the sprocket wheel 32. Mounted upon the shaft 33 and disposed within wheel 10 is a sprocket wheel 36 of relatively large diameter, and mounted in the disk 15 associated with wheel 10 is a stub shaft 37, carrying upon it a sprocket wheel 38, over which the chain 39 passes from sprocket wheel 36. This stub shaft 37 is mounted in suitable bearings in the disk 15 of wheel 10 and carries upon it the cam 40 which is formed with a sinuous cam track 41, shown as raised from the periphery of the cam 40. This cam operates the cutter bars, as will be later stated. Mounted upon the shaft 33 is a reel spider 42 having radially extending lugs, to which are attached radiating arms 43, in turn connected to transversely extending vanes 44. Attached to both disks 15 and extending across the machine is a downwardly and forwardly extending apron 45 of sheet metal, having a curvature corresponding to the arc of movement of the vanes 44, this apron forming a floor up which the cut grass is carried by the vanes 44. The apron is supported by lugs 46 and at its rear end extends rearward and slightly downward, as at 47. The plate 21 which, as before remarked extends entirely across the machine, is supported on the lugs 20 and at its forward margin is formed to provide a transversely extending channel 48 and the forward margin of the plate or apron 45 extends over this channel but is vertically spaced from the upper edges of the side walls thereof.

Reciprocating within the channel 48 are two knife bars 49 and 50, the knife bar 49 having a height greater than the knife bar 49, and mounted upon these knife bars are the knives 51 and 52. As shown more particularly in Fig. 6, the knives 51 rest upon the upper face of the knife bar 49, and the knife bar 50 has a height equal to the combined height or thickness of the knife bar 49 and the knives superposed thereon, so that the knives 52 will extend over the knives 51 and bear flat thereagainst.

The ends of the respective knife bars 51 and 52, adjacent wheel 10, are formed to provide upwardly extending, divergently related members 53, the extremities of which are formed with heads having grooves 54 adapted to receive the cam rib 41 and embrace this cam rib. These upwardly extended portions or heads 53 of the knife bars are disposed, as illustrated in Fig. 4, on opposite sides or at diametrically opposite points of the cam 40 so that a rotation of the cam will cause the knife bars to reciprocate in relative opposite directions.

The knives 51 and 52 project in the same direction and the knives 52 are longer than the knives 51 so as to extend over the knife bar 49, and so that the extremities of all of the knives will be disposed in the same plane. Each knife or cutter 51 or 52 has a straight edge $a$, and an inclined edge $b$, this inclined edge being beveled, as at $c$. It will be seen that with the knives arranged as illustrated in Fig. 6, the beveled, inclined edge of one knife will coact with the straight edge $a$ of the adjacent knives so that the beveled edges of one set of knives will cut against the straight edges of the other set of knives. In the ordinary mowing machine, the beveled cutting edges operate against the straight edges of the fingers. This is not necessary with my device, as the two series of knives each formed with a straight edge and a beveled edge, do away with the necessity for these fingers and one knife cuts against the other knife. The apron 45 is, of course, cut away at one end to accommodate the members 53 and the cam 40.

It will be noted, of course, that the reel arms and vanes 43 and 44 not only act to carry the cut grass up the apron 45, but also act to support relatively long grass in proper position for the knives to cut. The lugs 46 are slotted and supported upon the disks 15 by means of bolts, thus permitting the apron 47 to be adjusted nearer to or farther from the plate 21. Furthermore, the reel arms 43 are longitudinally slotted and bolted to the lugs of the spider 42 so as to permit the reel arms to be adjusted nearer to or farther from their axis of rotation. The upwardly extending heads 53 of the knife bars 49 and 50 are held in engagement with the cam 40 by arcuate members 55, supported by screws 56 in the manner illustrated in Fig. 4, these screws supporting the fenders on the adjacent disk 15.

In order to provide for adjusting the knives nearer to or farther from the ground by tilting the disks 15 to a greater or less amount, I provide on each of the disks 15 downwardly and rearwardly extending arms 57, these arms 57 being pivotally mounted each upon a bolt 58 and intermediately formed with a transversely extending, elongated slot 59. A bolt 60 passes through this slot and through the corresponding disk 15, this bolt being provided with a nut. Thus, the arms 57 may be adjusted into different angular relations and held in the adjusted position by the bolts 60. Mounted upon the lower ends of the arms 57 is a transverse roller 61, which is of wood or like material and designed to roll upon the ground. It will be obvious now that when the arms 57 are turned into a nearly vertical position, they will tilt the disks 15 with relation to the axis so that the knives will be carried down nearer to the ground, and that when the arms 57 are shifted rearwardly and into nearer approximation to the horizontal, the disks will tilt backward, thus raising the knives. By this means, an adjustment of the knives to make a shorter or longer cut is provided for. Hook-shaped members 62 are also connected by the bolt 60 to the disks 15, the shanks of these hook-shaped members being formed with longitudinally extending slots 63, through which the bolts pass. These hook-shaped members are for the purpose of attaching to the machine an ordinary basket, such as is commonly used in connection with lawn mowers, into which the grass will be discharged. The hooks may be longitudinally or rotatably adjusted to any desired extent. Of course, the hooks will be disposed outward of the ends of the roller 61. Chain tightening rollers $29^a$ of the same type as the roller 29, are mounted upon brackets $30^a$ adjustable upon bolts $31^a$, and are provided for tightening the sprocket chains 39 and 35, these being mounted upon any suitable portion of the disks 15.

Pivotally mounted upon the disks 15 are the handle bars 64, which are connected by a cross bar 65, as illustrated in Fig. 7, and are mounted for slight oscillation between stop lugs 66 formed upon the corresponding disks to permit a certain flexibility in the handles. I do not wish to be limited to this particular type of handle, but preferably use it, as by its means an endless carrier and conveyer trough may be mounted upon the handles, as illustrated in Fig. 7. To this end, I mount between the disks 15 below the apron 45, a carrier driving roller 67, the shaft $67^a$ of which carries a sprocket wheel 68, the sprocket chain 35 extending downward over this sprocket wheel 68 and then extending to the sprocket wheel 34. Where this sprocket wheel 68 is not used, the sprocket chain 35 extends directly from the wheel 32 to the sprocket wheel 34. A transversely extending roller 69 is operatively supported in the outer ends of the bars 64 and over these rollers passes an endless band 70 having transverse strips 71 at intervals and forming an endless carrier. This endless carrier is disposed at an inclination to the handle bars 64 and operates within a trough 72 which may be of flexible material or of thin metal, and which is attached to the handle bars. At its outer end, the endless carrier discharges into a chute 73 which, in turn, may discharge into a cart, basket, or other container for the grass.

It its obvious that I do not wish to be limited to the construction illustrated in the several figures, as the details of this construction may be changed in many ways without departing from the spirit of the invention. The advantages of my machine are as follows: Constructed as it is with reciprocating knives, it will cut much taller grass than lawn mowers in which rotatable blades are provided, and furthermore the knives can be readily removed and sharpened when they become dull, whereas the grinding of the spiral blades of the ordinary lawn mower requires very skilful manipulation. Furthermore, the knives may be adjusted nearer to or farther from the ground with but very little trouble and the two sets of knives operating in conjunction with each other exert a very powerful shearing action. It will be seen that the multiplying gearing which I have provided causes the cutting knives to reciprocate at a relatively high speed so as to give great capacity, and furthermore it will be seen that all the relatively delicate mechanism which operates the sickles is entirely housed so that grass, trash and dirt cannot come in contact with this mechanism, which may be kept thoroughly oiled without any chance of its becoming clogged by oil and foreign matter.

I do not wish to be limited to the use of sprocket chains and sprocket wheels as the means for driving the driven elements from the driving elements, as other forms of gearing might be used, though I regard the sprocket wheels and chains as being preferable, as wear may be taken up by means of the chain tighteners.

I claim:—

1. A lawn mower comprising oppositely disposed traction wheels having inwardly extending peripheral flanges, stub shafts mounted on the traction wheels extending inwardly therefrom, oppositely disposed, spaced disks loosely mounted on the stub shafts, transverse members connecting the disks, cutting knives operatively supported by the disks, a reel disposed above the cutting knives and rotatably mounted upon said disks, gearing disposed between the disks and the traction wheels and housed by the traction wheels and operatively connected to the reel to drive it and operatively connected to the cutting knives, and means for rotatively adjusting the disks upon the stub shafts to carry the knives nearer to or farther from the ground.

2. In a lawn mower, oppositely disposed traction wheels, stub shafts mounted thereon and extending inwardly therefrom, oppositely disposed spaced disks loosely mounted on the stub shafts, transverse members connecting the disks, a pair of transversely extending knife bars operatively supported by the disks, gearing disposed between the disks and the traction wheels and housed by the traction wheels causing the reciprocation of the knife bars in relatively opposite directions, coacting, forwardly projecting, cutting knives mounted upon the knife bars, and means for adjusting the disks to carry the knives nearer to or farther from the ground including arms pivoted to the disks and extending rearwardly and downwardly therefrom and angularly adjustable upon their pivots, and a ground engaging roller mounted upon said arms.

3. A mowing machine including traction wheels having circumferential flanges and each having an inwardly projecting stub shaft, a pair of disks operatively connected to each other and loosely engaging the stub shafts, said disks fitting within the flanges of the traction wheels, driving gear wheels mounted between the disks and the traction wheels and loosely mounted on the stub shafts, means causing a rotation of the gear wheels with the stub shafts upon a movement of the traction wheels in one direction to permit an independent movement of the traction wheels in the other direction, a transversely extending channeled member mounted upon and extending between the disks, a knife bar mounted in the channeled member and having a set of forwardly projecting cutting knives, a cam shaft carried by one of said disks and having a cam operatively engaging the knife bar to cause its reciprocation upon a rotation of the cam shaft, gearing operatively engaging the cam shaft with one of said main driving gear wheels, a reel shaft mounted upon the disks and carrying a reel operated above the cutting knives, driving means between the reel shaft and one of said main driving gear wheels, and means for raising or lowering the disks rearward of the stub shafts to thereby adjust the cutting knives nearer to or farther from the ground.

4. In a lawn mower, traction wheels, a pair of transversely extending knife bars carrying forwardly projecting, coacting, superposed cutting knives, the knife bars terminating in divergent heads, a cam shaft extending between said heads and carrying a cam engaging therewith, the heads engaging on opposite sides of the cam and the cam being sinuous in form, and means for transmitting power from the traction wheels to said cam to thereby cause a reciprocation of the knife bars in relatively opposite directions.

5. In a mowing machine, traction wheels, a transversely extending channeled member operatively supported by the traction wheels, a pair of knife bars disposed in said channeled member and carrying coacting, overlapping, forwardly projecting cutting knives, said knife bars having upwardly extending, divergent heads, a cam shaft extending between the heads and carrying a sinuous cam operatively engaging the knife bars to cause their reciprocation in relatively opposite directions, means for driving the cam from the traction wheels, and detachable means engaging over the heads and holding them in engagement with said cam.

6. A lawn mower including oppositely disposed traction wheels, each traction wheel having an inwardly projecting flange and a stub shaft, disks loosely mounted upon the stub shafts and fitting within the flanges of the traction wheels, said disks being operatively connected to each other, a transversely channeled member carried by the disks, a pair of knife bars reciprocating in the channeled member and having coacting cutting knives, a cam shaft carried by one of said disks and having a cam operatively engaging the knife bars to cause their relative opposite reciprocations, a sprocket pinion mounted upon the cam shaft, a main sprocket wheel mounted upon one of the stub shafts, a sprocket pinion mounted on the disk and over which the chain from the main sprocket wheel passes, a relatively large sprocket wheel mounted in connection with said pinion, a second sprocket pinion, a sprocket chain driving the second sprocket pinion from the last named sprocket wheel, a relatively large sprocket wheel driven by the second named sprocket pinion, and a sprocket chain passing over the last named sprocket wheel to the sprocket wheel on the cam shaft.

7. A lawn mower including oppositely disposed traction wheels, each traction wheel having an inwardly projecting flange and a stub shaft, disks loosely mounted upon the stub shafts and fitting within the flanges of the traction wheels, said disks being operatively connected to each other, a transversely channeled member carried by the disks, a pair of knife bars reciprocating in the channeled member and having coacting cutting knifes, a cam shaft carried by one of said disks and having a cam operatively engaging the knife bars to cause their relative opposite reciprocations, a sprocket pinion mounted upon the cam shaft, a main sprocket wheel mounted upon one of the stub shafts, a sprocket pinion mounted on the disk and over which the chain from the main sprocket wheel passes, a relatively large sprocket wheel mounted in connection with said pinion, a reel shaft mounted on the disks and carrying a reel, a second sprocket pinion, a sprocket chain driving the second sprocket pinion from the last named sprocket wheel, a relatively large sprocket wheel driven by the second named sprocket pinion, and a sprocket chain passing over the last named sprocket wheel to the sprocket wheel on the cam shaft.

8. A lawn mower of the character described comprising oppositely disposed traction wheels having inwardly extending flanges and stub shafts, oppositely disposed, spaced disks loosely mounted upon the stub shafts and fitting the flanges and operatively connected to each other, oppositely disposed shafts mounted upon said disks, a pair of sprocket wheels carried upon each of said shafts and disposed between the disk and the corresponding traction wheel, operative driving connections between the two sprocket wheels, driving wheels mounted upon the stub shafts and operatively geared with one of said sprocket wheels, a cam shaft carried upon one of the disks and operatively geared to one of said sprocket wheels, a reel mounted upon the shaft of the other pair of sprocket wheels, a channeled member mounted upon the disks and extending thereacross, a pair of knife bars carrying two sets of cutting knives disposed in said channeled member and having heads, a sinuous cam carried upon said cam shaft engaging said head to cause a reciprocation of the cutting bars in relatively opposite directions, an apron adjustably mounted upon the disks and extending over said channeled member and the knives mounted upon said knife bars, said reel acting to shift the cut material upward and rearward on said apron, and handle bars operatively connected to the disks.

In testimony whereof I hereunto affix my signature in the presence of two witnesses.

NOAH J. BECKNER.

Witnesses:
 FREDERIC B. WRIGHT,
 ROBERT A. BOSWELL.